INVENTOR
THOMAS SAMUEL SKILLMAN.
BY Ward, Crosby & Neal
ATTORNEYS

INVENTOR.
THOMAS SAMUEL SKILLMAN.
BY Ward, Crosby & Neal
ATTORNEYS.

INVENTOR
THOMAS SAMUEL SKILLMAN.
BY Wood, Conly & Neal
ATTORNEYS

Patented Aug. 14, 1951 2,564,378

UNITED STATES PATENT OFFICE 2,564,378

CARRIER SYSTEM SIGNALING CIRCUITS

Thomas Samuel Skillman, Mosman, near Sydney, Australia, assignor to Punch Engineering Pty. Ltd., Cammeray, near Sydney, Australia, a corporation of Australia Application April 8, 1947, Serial No. 740,083
In Australia May 6, 1946

7 Claims. (Cl. 179—2.5)

The invention relates to telephone systems wherein carrier channels are used to transmit speech currents, and more particularly to the conveying of signals in such systems.

It will be seen later on that in comparison with the arrangements hitherto best known and most favoured technically for setting up a call in such a telephone system, simplifications are brought about by the invention. The new arrangements provided in accordance with the invention are therefore of improved reliability and, of course, are also cheaper.

*The telephone circuits*

The "making of a call" in a modern telephone system (whether manual or automatic, or partly both), necessitates that certain signals from a calling circuit (extending up to a first location—see below) be conveyed into a called circuit (commencing at a second location), and vice versa.

The said first location may be merely the first exchange (or sub-exchange) encountered along the route to be taken by the call when ultimately set up; or may be any intermediate switching point (sometimes referred to as a tandem switching point). In the first case the calling circuit would be an outgoing cord circuit or its equivalent at this first exchange or sub-exchange; while in the other case the calling circuit would be an inter-exchange link (or whole chain of such links) temporarily linking up firstly the particular outgoing cord circuit used at the first exchange, and secondly the intermediate or tandem switching point. In the latter case, of course, the incoming end of the link or chain of links is the only portion of the calling circuit which is at the first location.

The called circuit may be either the incoming cord circuit or a connector switch circuit located in either case at the final destination exchange, which would then be the second location; or again the called circuit may be merely a switching mechanism which is located at an intermediate or tandem switching centre and which, upon correct manipulation, will eventually become the starting point of a link (or whole chain or links) which extends to the called subscriber's station. In the latter case: (*a*) the second location is the tandem switching centre; and (*b*) only the outgoing end of the link (or chain of links) is at the second location.

All of the links described above may be automatic, or manual, or partly both.

*The signals conveyed*

The several signals, which, as stated above, must be conveyed from the calling circuit into the called circuit and vice versa, are: the "call" signal; the "supervisory" signal; and either the "forward clear" or the "backward clear" signal, whichever is required the first.

These signals, and their use in the various kinds of telephone systems, are well known; and neither the signals per se, nor their use in telephone systems in general, is the subject of the present invention, which, as abovementioned, is concerned rather with the problems of conveying these signals in particular circumstances which will be elaborated later.

Other signals such as dialling (or number transmission) signals are sometimes required in setting up a call, but these other signals will not be discussed until later on, when they will enter the discussion more naturally.

*Speech transmission*

In addition, in order to set up a call in a telephone system, some sort of link is necessary between the calling circuit and the called circuit to transmit speech currents back and forth as required.

*The junctions*

In the usual run of telephone systems, all the facilities just described are provided by so-called D. C. junctions. A D. C. junction is a metallic connection capable of transmitting direct current with reasonable efficiency, and also capable of transmitting with reasonable efficiency voice frequency currents up to at least limiting frequencies required for telephonic speech. Thus a D. C. junction will transmit currents ranging from D. C., or zero frequency, up to say 3000 cycles per second with a loss of only a few decibels.

*The form of signalling*

The usual calling circuits give out and respond to so-called steady state direct current signals, as do likewise the usual called circuits. Signals in this form tie in with the use of links in the form of D. C. junctions just described.

In the case of the calling circuit, the first signal given out is the "call" signal; and usually this signal is given by the change from an altogether negligible flow of direct current to a substantially increased flow of direct current.

After the signal, the flow is substantially constant; and such variations as do occur are due to undesired fluctuations in the line conditions, which justifies the use of the term "steady state" in this regard. The steady state is really a condition persisting between signals, which are conveyed solely by the change. The actual extent of the increase (as the change is in this case), usually depends upon the necessity to successfully operate a relay at the second location.

Again, the "forward clear" signal is conveyed by the reversion from the abovementioned increased flow of direct current to the original negligible flow.

In this so-called backward direction of switching, that is, from the called circuit to the calling circuit, the first signal given out is the "supervisory" signal, which indicates that the called subscriber has answered; and this also is usually a steady state direct current signal. One form of the supervisory signal is a reversal of polarity of the already existing (increased) flow of direct current, the latter being present of course as a persisting consequence of the prior occurrence of the "call" signal. The reversal of current just described is the appropriate form of the supervisory signal in a two-wire signalling system, whereas in a 4-wire signalling system the supervisory signal most naturally assumes the form of an increase from a negligible to a substantial flow of direct current in a backward signal lead.

Finally, the "backward clear" signal consists of a reversal of the change which conveyed the "supervisory" signal. That is: a restoration to the original direction of current flow in a 2-wire circuit; and a cessation of current flow in a 4-wire signalling circuit.

As mentioned above, all these arrangements are very well known per se, and are mentioned here as a brief recapitulation of present practices, and also to make clear what is meant herein by the term "steady state direct current signals."

*The problems leading to and arising from the use of carrier link*

The so-called D. C. junction arrangements just described are those usual in telephone systems whenever the distance between a calling circuit and the corresponding called circuit is short enough for such arrangements to be practicable. As is well known, however, such circuits cannot be used over great distances whenever reliable operation and an economic price are both demanded. D. C. transmission becomes too uncertain unless very heavy gauge and very well insulated conductors are used, which however, is most uneconomical; and also the problems of speech transmission becomes intensified as the distance increases. For larger distances, for example between cities, the most common contemporary practice is to incorporate carrier telephone apparatus to cater for the speech, since such apparatus can, and usually does, provide a zero equivalent between its terminals. Thus, for a link between two distant cities, carrier telephone circuits are frequently used for this reason alone.

Now a carrier telephone channel is by international agreement required to transmit the voice range from higher frequencies down only to 300 cycles per second, or some frequency of that order. In the absence of conventional D. C. paths over a carrier channel, the problem of conveying the steady state direct current signals becomes more difficult, and the usual practice has been to translate these signals from steady state direct current signals into some other form. For example, the various steady state direct current signals are frequently translated into signals in the from of pulses of voice frequency currents, and in the latter form each signal is conveyed between the two locations by transmission of the voice frequency currents over the appropriate channel or the carrier circuit.

*Pulse signalling*

In one such system a pairly extensive use for long distance links, for example between cities, the call signal is translated into a sequence of pulses. These are pulses of two voice frequencies approximately 600 cycles per second and 750 cycles per second, both of which will be readily and efficiently transmitted over carrier channels.

The calling procedure is as follows. An answer signal is sent back from the called station upon receipt of a comparatively elementary initial portion of the call signal; and an answer acknowledgement signal, the remainder of the call signal, must be sent in the proper manner from the calling circuit before the called circuit will finally respond to register an incoming call.

The initial part of the call signal consists of a burst of 750 c./s current. The answer signal consists of several bursts of 600 cycles per second current, the envelope containing gaps which must be filled in by the answer acknowledgement signal, also of 600 cycles per second, before the called circuit will respond and register an incoming call. This inevitably involves a very considerable number and complication of relays, and considerable design problems; although when once designed, the circuits can be made to operate very reliably, provided the equipment is reasonably maintained. The expense, both of equipment and maintenance, is considerable. What is in very high demand, however, will inevitably be paid for, and the considerable expense of pulse signalling equipment in comparison with the few simple relays required at the ends of a D. C. junction, still has not prevented pulse signalling over carrier channels from having attained a very considerable vogue.

*Results which will follow from using the invention*

By the invention very considerable economies are made in the number of relays required for conveying the so-called steady state direct current signals from the called circuit to the calling circuit and vice versa. The ways hitherto best known and most widely favoured for setting up a call over a link involving a carrier transmission path are therefore simplified; and as a consequence are improved in reliability as well as made cheaper.

*General nature of the invention*

In its most general aspect the invention is a combination of: firstly, a calling circuit plus a called circuit, between which are to be conveyed so-called steady state direct current signals, as mentioned above; and secondly, a connecting link in the form of a carrier communication circuit arranged to transmit speech currents between the calling circuit and the called circuit, as required. The whole equipment is arranged (*a*) to translate the steady state direct current signals into changes from one to another of two distinct steady states of carrier current transmitted in the same direction in said communication circuit as the signal is to be conveyed, and (*b*) to retranslate to the form of steady state direct current signals, the changes in the carrier current received at the other end of the carrier communication circuit. By this combinative arrangement, the number of signalling relays in the system is reduced from the larger number required for pulse signalling over carrier channels, to the same number as are required at the ends of a D. C. junction, no extra relays being occasioned by reason of the carrier apparatus; and the same simplicity of signal current conditions is brought about in the carrier communication circuit as already exists in D. C. junctions carrying said direct current steady state signals.

*Number transmission*

As abovementioned, other signals sometimes have to be conveyed. A very frequent requirement is dialling for number transmission. In applying the technique of chopping the carrier off and on under the control of the dial, a problem arises when the steady state direct current signals are conveyed as explained above, which problem does not arise when they are translated into pulses as in the earlier arrangements. This is the problem of avoiding a false clear signal while dialling.

To secure immunity, the time constant must be watched to insure that the apparatus, after once responding to the "call" signal, will not be released by chopping the carrier off and on. The time constant required is determined by the speed of the dial. A complete cycle, from the first cutting off of the carrier under control of the dial, including the restoration, and finishing at a second cutting off of the carrier, usually occupies 100 milli-seconds but may occupy 140 milli-seconds. Thus a time constant safely larger than the latter will suffice.

*The preferred form of the invention*

In a preferred form, the carrier transmitted in the same direction in the communication circuit as the forward direction of switching is kept fully suppressed prior to the call signal, and is increased to its full strength upon the occurrence of a call signal and remains at this level until a forward clear signal is received. This full strength carrier is made of sufficient amplitude to permit of envelope detection of speech sidebands. In the backward direction of switching the carrier is increased to its full strength upon the occurrence of the supervisory signal (which indicates that the called subscriber has answered) and remains at full strength until the occurrence of the backward clear signal.

Between the call signal and the supervisory signal, however, the efficient use of telephone switching facilities imposes a requirement that "dial tone," "ringing tone" and any signals of this character should be conveyed back to the calling circuit. In addition the transmission of operators' conversations is required in certain circumstances.

In this preferred form, therefore, the level of carrier current in the backward direction of switching is kept at a maximum. The maximum which can be used is, of course, that which still permits the conveying of a backward clear signal. With the usual operating properties of relays, a level which gives an adequate margin in conveying a backward clear signal gives an extra margin in avoiding a false call signal.

*Alternative form of the invention*

As an alternative to this latter arrangement, however, the level of carrier current in the backward direction of switching may be kept fully suppressed between the occurrence of the call signal and of the supervisory signal, and an auxiliary oscillator provided at the outgoing end to demodulate the abovementioned tones and conversation. This oscillator would be arranged to be automatically switched in and out of circuit as it is required, and there is a limit to the permissible output of this oscillator to avoid forming a false supervisory signal as will be seen when the circuits are described in detail.

*Further problem with envelope detection*

To avoid distortion in the envelope detector prior to the supervisory signal, should speech levels then occur which are only just below the overload point or distortion limit after the supervisory signal: the level must be reduced in the sending equipment at the incoming end of the carrier link. This is achieved by attenuating means at both ends in the carrier speech path for the backward direction. Prior to the supervisory signal, the attenuating means at the incoming end is in circuit, that at the outgoing end being cut out of circuit. After the supervisory signal, the position is reversed, the attenuating means being cut out from the incoming end and inserted at the outgoing end. This maintains the gain uniform in all conditions.

*Detailed description of an example form of the invention*

These and other features of the invention will be more fully understood from the following description with reference to the attached drawings.

Figure 1:
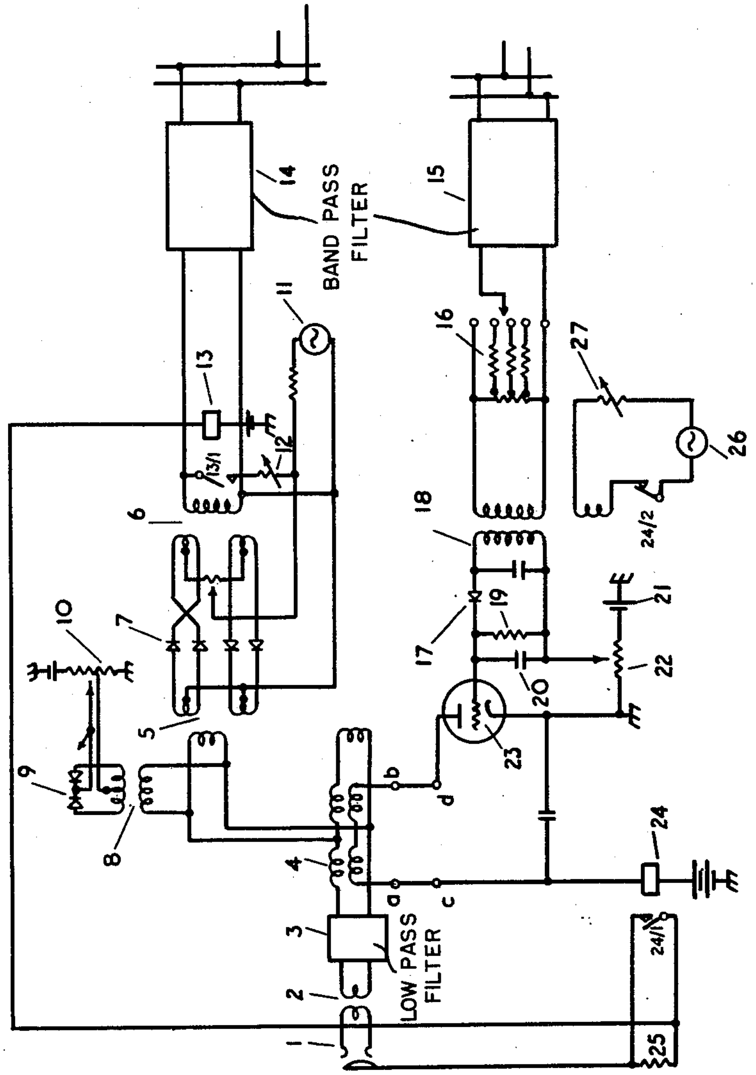
Fig. 1 shows the circuit of the terminal equipment of one embodiment of the invention.

Fig. 1 shows the transmitting and receiving equipment of one channel. The channel terminates at the jack 1 which is picked up by the operator when she wishes to make a call outgoing from this terminal. The transmission path leads over the transformer 2 to low pass filter 3, the hybrid coil 4 to the modulator consisting of the transformers 5 and 6 and the rectifier group 7. The volume limiter consisting of transformer 8, rectifiers 9 and bias potentiometer 10 is connected with the transmission path. The carrier supply 11 is connected in bridge relationship with the modulator and furthermore fed to the line via an adjustable resistor 12 (which determines the sending level) and the contact 13/1 of relay 13. This relay is operated when the operator plugs in and keeps the carrier current on the line until the operator pulls out again. Transmission to the far terminal takes place via the BP filter 14.

The arrangement by which the carrier is balanced out in the modulator and added to the line at the output of the modulator has the advantage that the depth of modulation is controllable without changing the side band level, i. e. without changing the overall loss of the circuit. Furthermore, the level of the carrier current is independent of any modulator characteristics and thus results in greater stability for the carrier signals.

The receiving equipment comprises band pass filter 15 which passes transmitted carrier current and the sidebands to the potentiometer 16, the transformer 18 and the detector 17. The rectification of the incoming signal causes a voice frequency voltage to be produced across resistor 19 and condenser 20 and also a direct-current voltage at the same components. This direct-current voltage neutralises the negative bias produced from the battery 21 and potentiometer 22 and thus permits plate current to flow through valve 23 and to operate relay 24 in the anode circuit of this valve. The relay 24 closes contact 24/1, short circuits resistor 25 and thus operates a marginal relay (not shown) in the sleeve circuit of the operator's cord circuit to control a supervisory lamp. As soon as the transmitted carrier current is removed, the direct-current voltage across resistor 19 is not sufficient to offset the negative bias from potentiometer 22 and the plate current drops to a value such that relay 24 releases. Relay 24 is thus operated by the change from one distinct steady state to the other in the same way as if operated by direct current transmitted over the line.

The foregoing explanation assumes that an identical pair of sending and receiving circuits are in existence at the other end. There is, however, a difference when the other end provides for an automatic exchange. Thus, when the relay corresponding to 24 is energised at the far end in response to the operator plugging in jack 1, this relay closes its circuit and causes the automatic first group selector to be picked up. When the operator dials relay 13 follows the dialling pulses and in turn operates the relay corresponding to relay 24 at the incoming end causing it to send impulses out to the automatic equipment. The relay corresponding to relay 13 at the incoming end is operated when the subscriber replies and released when he hanges up and thus sends signals back to relay 24 as will be shown later on in connection with the arrangement of Fig. 4.

Figure 3:
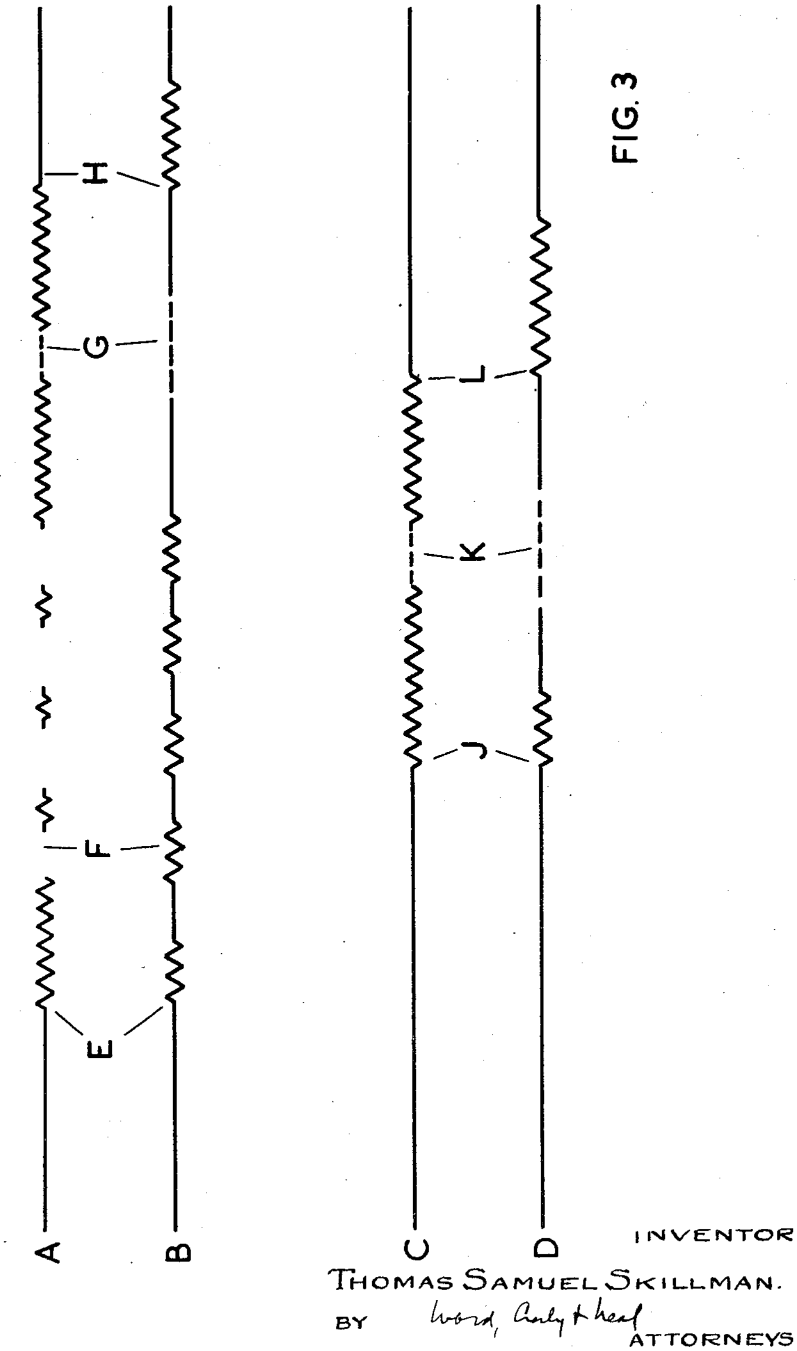
Fig. 3 shows diagrammatically the working principle according to the invention in comparison with the working principle used so far.

The working principle of the new arrangement is shown in Fig. 3 in comparison to the working principle used hitherto. Fig. 3 shows the carrier current which occurs in the line in the outgoing or forward direction and the incoming or backward direction, corresponding to the different stages of the call. The scale of time proceeds from left to right starting when the operator plugs in and finishing when the operator releases. The curves A and C show the carrier current on the line according to the present invention in the forward and backward direction respectively. The curves B and D show the current on the line for known carrier pulse signalling systems. The various stages in building up a connection are marked as follows: In the forward direction E denotes the point when the operator plugs in. The carrier current is switched on for curve A as well as curve B. Whereas in curve A according to the invention, the carrier current remains on the line, curve B for the known arrangements indicates that only a short pulse is transmitted. When the operator dials the carrier current is interrupted in curve A according to the pulses but switched on for the pulses in curve B as indicated at F. After dialling and during conversation, the new arrangement shows the carrier current on the line all the time as indicated at G whereas the old arrangement suppresses the carrier current during conversation. At the termination of the conversation when the operator disconnects, the carrier current is cut off immediately as shown at H in curve A whereas in the known arrangements, a special pulse is given to indicate the termination. The known arrangement producing signals as shown in curve B has the disadvantage that special relay groups are necessary to distinguish between the short pulse at the beginning and the longer pulse at the end of the conversation and to prevent the circuit from getting out of step. These difficulties do not arise when the system fulfills the functions as shown in curve A.

In the backward direction as indicated in curve C, for the new arrangement and in curve D for arrangements used so far, the same considerations apply as mentioned for the forward direction. When the subscriber replies, the carrier current is provided continuously as shown in curve C and as a short pulse for the known arrangements of curve D as indicated at J. The period of conversation marked K corresponds to the period G in curves A and B and shows continuous carrier current in curve C and suppressed carrier current for curve D. The release of the line by the subscriber indicated at L has the same effect as the release H of the operator. Whereas according to the invention (curve C) the carrier is cut off, curve D shows a longer pulse to indicate the termination of the connection. Here again the advantage of the new arrangement lies in the fact that no special arrangements are necessary to distinguish between short and long pulses for the various switching operations.

Returning now to Fig. 1 and considering that sidebands would come in without transmitted carrier, there will be insufficient direct current voltage across resistor 19 to operate relay 24. The negative bias of potentiometer 22, however, will not be such that the valve ceases entirely to amplify but only that it moves to a less steep part of its slope and thus cannot handle such big power. The sidebands coming in will then be demodulated by means of a carrier current drawn from a local carrier supply 26 via a special winding of transformer 18. The level of this carrier supply is adjusted by means of a resistor 27 to such value that it cannot cause false operation of relay 24. The local carrier supply 26 is switched off by the extra contact 24/2 of relay 24 when this relay operates in response to the reception of the transmitted carrier.

The limiter 8—9 in the sending equipment of the outgoing end prevents any sideband from reaching a magnitude comparable with the carrier transmitted and thus ensures that false operation of relay 24 cannot occur to any troublesome degree.

The voice frequency components applied to the grid of valve 23 are amplified in the usual way and pass by the hybrid coil 4, low pass filter 3, transformer 2, out to the operator or calling subscriber. It will be clear that the carrier supply 26 can be arranged in bridge relationship with the incoming carrier and the signal receiver so that the local carrier supply can be of quite high level but still would not operate the receiver which thus would be operated by the incoming transmitted carrier current only.

In place of the local carrier supply 26, a reduced carrier coming over the line at a lower level would have exactly the same effect. Such reduced carrier could be obtained by arranging for the contacts of relay 13 and its far end counterpart not to open the circuit entirely, but merely to introduce additional resistance so as to drop the level of the transmitted carrier. Such arrangement is, for example, shown in Fig. 4 and will be described hereafter.

Figure 2:
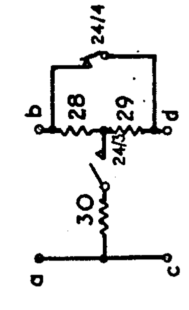
Fig. 2 shows details to modify the arrangement shown in Fig. 1.

It will be clear that the inferior standard of transmission prior to the operation of relay 24 (Fig. 1) need not be limited to inferiority in attenuation. For example, relay 24 when operated may easily be arranged to change the gain or loss in some part of the circuit so that the overall attenuation remains approximately the same for the two conditions. In such a case, however, the extra gain introduced to offset the loss when full carrier is not transmitted will have the effect of increasing also the noise at the terminals of the circuit during this period. This extra noise will, however, only be present when the operators are talking or are listening in for tone and will not appear during the subscriber's conversation. As an example, a 4-terminal network as shown in Fig. 2 may be inserted in Fig. 1 between the terminals *a*, *b*, *c* and *d* instead of the direct connections between *a* and *c* and *b* and *d*. This network of Fig. 2 consists of the resistors 28, 29 and 30 which form an attenuation pad and two further contacts 24/3 and 24/4 of relay 24. Whenever the high level carrier is present, operation of relay 24 introduces this pad by closing contact 24/3 and opening contact 24/4 and thus corrects for the change of gain in the preceding amplifier.

Figure 4:
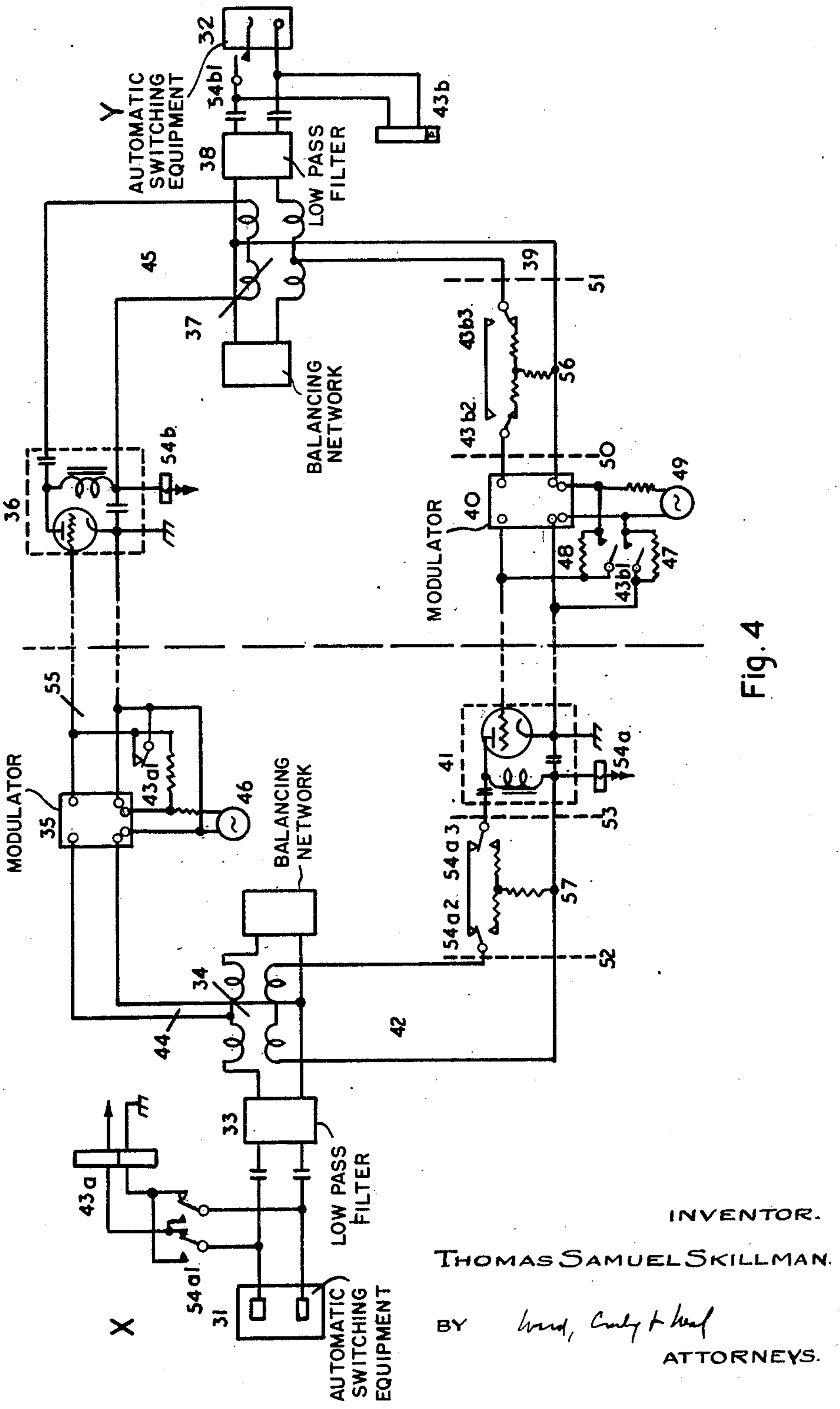
Fig. 4 shows the circuit diagram for one embodiment of the invention working in one direction between automatic exchanges.

Fig. 4 shows the circuit for an arrangement according to the invention providing switching facilities in one direction between the outgoing equipment 31 of an automatic exchange, and the automatic exchange with which the called subscriber is connected and which is represented by the switch wipers 32. Transmission from equipment 31 to equipment 32 takes place over the circuit passing through the low pass filter 33, hybrid transformer 34, sending modulator 35 and over the transmission path of the carrier transmission system to detector and amplifier 36 at the incoming end. The output of amplifier 36 is connected with the hybrid transformer 37 and through this transformer with low pass filter 38 and the equipment 32.

In the other direction from incoming end Y to outgoing end X, speech signals are taken from the exchange equipment 32 through the low pass filter 38 and hybrid transformer 37 and then through line 39 into the modulator 40 from which the signals are transmitted over the carrier telephone system in the reverse direction. After detection, the speech signals are amplified in the amplifier 41 and pass via the line 42 into the hybrid transformer 34 and from there to low pass filter 33 to the exchange equipment 31.

Connected with the exchange equipment 31 at the outgoing end X is a relay **43*a* which receives signals from the exchange 31. When this relay is operated, contact 43*a*1 removes the short circuit from the sending line 55 coming out of the high frequency side of the modulator 35 and thus permits the carrier current from the carrier supply 46 to be transmitted over the transmission path in full strength whenever the channel is seized by operation of the automatic equipment 31. A similar relay 43*b* at the incoming end Y is operated when the called subscriber answers. The contact 43*b*1 of this relay, short circuits resistors 47 and 48, connecting the carrier current supply 49 directly with the high frequency side of modulator 40. Thus in the unoperated state of relay 43*b*, the carrier current from the supply 49 is transmitted at a reduced level over the transmission path and when the relay 43*b*** operates, the level of the carrier current is changed to full strength.

At the incoming end Y, two contacts **43*b*2 and 43*b*3 are interposed as shown, between the vertical dotted lines 50 and 51 in the transmitting lead 39 from the hybrid transformer 37 to modulator 40. These contacts 43*b*2 and 43*b*3 insert the attenuating pad 56 into the leads in the unoperated condition of relay 43*b* and remove the pad in the operated condition of this relay. A similar arrangement is made at the receiving side at the outgoing end X where the attenuating pad 57 is inserted in the leads 42 between the dotted lines 52 and 53. The insertion of this pad 57 depends on the operation of relay 54*a* connected with the amplifier 41 and operated depending on the level of the carrier transmitted from the incoming end Y. As long as this relay is unoperated, leads connecting amplifier 41 and the hybrid transformer 34 are switched straight through, but when the carrier current is transmitted in full strength from the incoming end Y to the outgoing end X, relay 54*a* is operated and by operating its contacts 54*a*2 and 54*a*3 inserts the pad 57 into the line. The gain of the amplifier 41 at the receive side of the outgoing end is sufficient so that the transmission loss from the incoming exchange 32 to the outgoing exchange 31 will have the normal value even with the additional pads 56 or 57 whichever is in the circuit. The additional contacts 54*a*1 of relay 54*a* reverse polarity at the incoming leads to give an indication back into the exchange 31 when relay 54*a*** is operated to indicate that the called subscriber has replied.

When relay **43*a* temporarily releases in response to dialling pulses from the outgoing exchange 31, its contact 43*a*1 follows these pulses, short circuiting the carrier current supply 46 and the line 55. Thus, the temporary carrier current is suppressed intermittently from the outgoing end. Relay 54*b* at the incoming end which operates in response to the full strength carrier current when the channel was seized by the automatic equipment 31 now releases and opens its contact 54*b*1 in the loop of the incoming exchange 32. In this way, dialling impulses are transmitted from the exchange 31 of the outgoing end X to the exchange 32** of the incoming end Y by the variation of the carrier between suppression and full strength, which means by the changeover from one steady state to another.

In the reverse direction from the incoming end Y to the outgoing end X, the pad 56 is included in the circuit and the pad 57 is removed from the circuit as long as the called subscriber has not answered. The carrier current transmitted from the carrier supply 49 via the resistors 47 and 48 which bridge contacts **43*b*1 is insufficient to operate relay 54*a*. When the called subscriber answers relay 43*b* is operated. The contacts 43*b*2 and 43*b*3 remove the attenuation pad 56 from the line. The contacts 43*b*1 short circuit the resistors 47 and 48 and the carrier current is transmitted over the transmission path at full strength. This carrier current operates relay 54*a* at the outgoing end X which in turn includes the pad 57 into the line via contacts 54*a*2 and 54*a*3** so that the total loss is maintained constant.

It will be apparent that the whole arrangement just described with reference to Fig. 4 provides between the automatic exchanges an identical link to that which would be provided by a D. C. junction. Furthermore, a considerable economy is achieved in the number of necessary relays as compared with known systems of this type and particularly with those systems relying upon pulse signalling. The number of relays used for signalling in the present system is the same as that constituting an auto to auto repeater, one of which normally appears at each end of a D. C. junction.

The above remarks on economy of relays apply with appropriate modifications also to arrangements according to the invention used between exchanges of any sort. For example, between a manual and an auto exchange, the number of relays is the same as that used in auto to manual or in manual to auto repeaters on a D. C. junction.

It will be clear that the invention can be applied also to two-way circuits with a changeover relay changing over the functions of incoming and outgoing ends in the usual manner. Furthermore, the receiving gain at the outgoing end can be changed in any other manner, for example, by a change in the back coupling of the receiving amplifier.

Switching operations of a different nature can be performed on a time basis for changes in carrier current level. Switching means can be provided which operate only when the change in level of the transmitted carrier wave continues after a predetermined time period while other switching means can be operated by level changes of any length of time.

Other modifications of the circuit can be made without departing from the spirit of the invention. For example, at the receiving end, a normal type of balanced demodulator can be provided, the incoming transmitted carrier then being picked up separately and used to operate the separate signal receiver.

The new arrangement can be combined with arrangements working on the principle of suppressed carrier as well as the use of direct current signalling over the line. One channel can be set up with suppressed carrier working transmitting only the sideband in the voice frequency range and using the direct current signalling in this direction over the line. In the reverse direction, signalling with transmitted and suppressed carrier as described above can be used.

In the appended claims, the expression "means for indicating that the call has been answered" is intended to include not only visual indicating means but also any device which is responsive to a backward answer signal and which performs a further function initiated by the answer signal.

The use of such arrangements depends partly on the properties of the available transmission path and it is within the scope of the invention to make such changes in the circuits as are necessary to meet the special requirements for each transmission path.

I claim:

1. In a telephone system including a first carrier terminal, a second carrier terminal and a carrier transmission path between said terminals, a first telephone circuit coming into said first carrier terminal and a second telephone circuit going out from said second carrier terminal; switching means connected at the outgoing end of said first telephone circuit for producing in said first telephone circuit a change from one to another circuit condition and a restoration from said change, means whereby said switching means is caused to operate substantially upon the initiation of a call and is caused to restore substantially upon the forward clearing of said call, said two circuit conditions being discrete for direct current, whereby said change and restoration convey forward signals over said first telephone circuit in the steady state direct current form; means at said first carrier terminal for generating a first carrier wave, and control means including means connected between said generating means and said transmission path for changing the transmission level of said first carrier wave in said path and means whereby said changing means is caused to operate in response to said change in said first telephone circuit and is caused to restore substantially upon said restoration from said change; receiving means at said second carrier terminal for receiving said first carrier wave; means in said second telephone circuit connected to said receiving means for producing in said second telephone circuit a change from one to another circuit condition in response to a change in said transmission level and for effecting restoration from said change in said second telephone circuit in response to restoration from said change in said transmission level, said two lastmentioned circuit conditions being discrete for direct current, whereby said lastmentioned change and restoration convey forward signals over said second telephone circuit in said steady state direct current form; and further switching means connected at the incoming end of said second telephone circuit for producing in said second telephone circuit a further change from one to another circuit condition and a restoration from said further change, means whereby said further switching means is caused to operate commencing substantially upon the answering of said call and is caused to restore substantially upon the backward clearing of said call, said two lastmentioned circuit conditions being discrete for direct current, whereby said lastmentioned change and restoration convey backward signals over said second telephone circuit in said steady state direct current form; means at said second carrier terminal for generating a second carrier wave, control means including means connected between said lastmentioned generating means and said carrier transmission path for changing the transmission level of said second carrier wave in said path and means whereby said lastmentioned changing means is caused to operate and thereby change said lastmentioned transmission level in response to said further change in said second telephone circuit and is caused to restore substantially upon said restoration from said further change; receiving means at said first carrier terminal for receiving said second carrier wave, and means in said first telephone circuit connected to said lastmentioned receiving means for producing in said first telephone circuit another change from one to another circuit condition in response to a change in said transmission level of said second carrier wave and for effecting restoration from said other change in response to restoration from said change in said transmission level of said second carrier wave, said two lastmentioned circuit conditions being discrete for direct current, whereby said lastmentioned change and restoration convey backward signals over said first telephone circuit in said steady state direct current form, and means in said first telephone circuit responsive to one of said lastmentioned backward signals for indicating that the call has been answered.

2. In a telephone system including a first carrier terminal, a second carrier terminal and a carrier transmission path between said terminals, a first telephone circuit coming into said first carrier terminal and a second telephone circuit going out from said second carrier terminal;

switching means connected at the outgoing end of said first telephone circuit for producing in said first telephone circuit a change from one to another circuit condition and a restoration from said change, means whereby said switching means is caused to operate substantially upon the initiation of a call and is caused to restore substantially upon the forward clearing of said call, said two circuit conditions being discrete for direct current, whereby said change and restoration convey forward signals over said first telephone circuit in the steady state direct current form; means at said first carrier terminal for generating a first carrier wave, and control means including means connected between said generating means and said transmission path for increasing the transmission level of said first carrier wave in said path and means whereby said increasing means is caused to operate in response to said change in said first telephone circuit and is caused to restore substantially upon said restoration from said change; receiving means at said second carrier terminal for receiving said first carrier wave; means in said second telephone circuit connected to said receiving means for producing in said second telephone circuit a change from one to another circuit condition in response to a change in said transmission level and for effecting restoration from said change in said second telephone circuit in response to restoration from said change in said transmission level, said two lastmentioned circuit conditions being discrete for direct current, whereby said lastmentioned change and restoration convey forward signals over said second telephone circuit in said steady state direct current form; and further switching means connected at the incoming end of said second telephone circuit for producing in said second telephone circuit a further change from one to another circuit condition and a restoration from said further change, means whereby said further switching means is caused to operate commencing substantially upon the answering of said call and is caused to restore substantially upon the backward clearing of said call, said two lastmentioned circuit conditions being discrete for direct current, whereby said lastmentioned change and restoration convey backward signals over said second telephone circuit in said steady state direct current form; means at said second carrier terminal for generating a second carrier wave, control means including means connected between said lastmentioned generating means and said carrier transmission path for increasing the transmission level of said second carrier wave in said path and means whereby said lastmentioned increasing means is caused to operate and thereby increase said lastmentioned transmission level in response to said further change in said second telephone circuit and is caused to restore substantially upon said restoration from said further change; receiving means at said first carrier terminal for receiving said second carrier wave, and means in said first telephone circuit connected to said lastmentioned receiving means for producing in said first telephone circuit another change from one to another circuit condition in response to a change in said transmission level of said second carrier wave and for effecting restoration from said other change in response to restoration from said change in said transmission level of said second carrier wave, said two lastmentioned circuit conditions being discrete for direct current, whereby said lastmentioned change and restoration convey backward signals over said first telephone circuit in said steady state direct current form, and means in said first telephone circuit responsive to one of said lastmentioned backward signals for indicating that the call has been answered.

3. In a telephone system including a first carrier terminal, a second carrier terminal and a carrier transmission path between said terminals, a first telephone circuit coming into said first carrier terminal and a second telephone circuit going out from said second carrier terminal; switching means including means for producing dialling impulses connected at the outgoing end of said first telephone circuit for producing in said first telephone circuit changes from one to another circuit condition and restorations from said changes, means whereby said switching means is caused to operate substantially upon the initiation of a call and is caused to restore substantially upon the forward clearing of said call, and two circuit conditions being discrete for direct current, whereby said changes and restorations convey forward signals including dialling impulses over said first telephone circuit in the steady state direct current form; means at said first carrier terminal for generating a first carrier wave, and control means including means connected between said generating means and said transmission path for changing the transmission level of said first carrier wave in said path and means whereby said changing means is caused to operate in response to said changes in said first telephone circuit and is caused to restore substantially upon said restorations from said changes; receiving means at said second carrier terminal for receiving said first carrier wave; means in said second telephone circuit connected to said receiving means for producing in said second telephone circuit a change from one to another circuit condition in response to a change in said transmission level, and for effecting restoration from said change in said second telephone circuit in response to restoration from said change in said transmission level, said two lastmentioned circuit conditions being discrete for direct current, whereby said lastmentioned change and restoration convey forward signals including dialling impulses over said second telephone circuit in said steady state direct current form, and further means connected with said second telephone circuit and having a time constant sufficiently long to be unresponsive to short-period level changes of said first carrier wave during the transmission of dialling impulses and being responsive to level changes of said carrier wave having durations longer than the intervals between said dialling impulses; further switching means connected at the incoming end of said second telephone circuit for producing in said second telephone circuit a further change from one to another circuit condition and a restoration from said further change, means whereby said further switching means is caused to operate commencing substantially upon the answering of said call and is caused to restore substantially upon the backward clearing of said call, said two lastmentioned circuit conditions being discrete for direct current, whereby said lastmentioned change and restoration convey backward signals over said second telephone circuit in said steady state direct current form; means at said second carrier terminal for generating a second carrier wave, control means including means connected between said lastmentioned generating means and said carrier transmission path for changing the transmission level of said second carrier wave in said path and means whereby said lastmentioned changing means is caused to operate and thereby change said lastmentioned transmission level in response to said further change in said second telephone circuit and is caused to restore substantially upon said restoration from said further change; receiving means at said first carrier terminal for receiving said second carrier wave, and means in said first telephone circuit connected to said lastmentioned receiving means for producing in said first telephone circuit another change from one to another circuit condition in response to a change in said transmission level of said second carrier wave and for effecting restoration from said other change in response to restoration from said change in said transmission level of said second carrier wave, said two lastmentioned circuit conditions being discrete for direct current, whereby said lastmentioned change and restoration convey backward signals over said first telephone circuit in said steady state direct current form, and means in said first telephone circuit responsive to one of said lastmentioned backward signals for indicating that the call has been answered.

4. In a telephone system including a first carrier terminal, a second carrier terminal and a carrier transmission path between said terminals, a first telephone circuit coming into said first carrier terminal and a second telephone circuit going out from said second carrier terminal; switching means connected at the outgoing end of said first telephone circuit for producing in said first telephone circuit a change from one to another circuit condition and a restoration from said change, means whereby said switching means is caused to operate substantially upon the initiation of a call and is caused to restore substantially upon the forward clearing of said call, said two circuit conditions being discrete for direct current, whereby said change and restoration convey forward signals over said first telephone circuit in the steady state direct current form; means at said first carrier terminal for generating a first carrier wave, and control means including means connected between said generating means and said transmission path for causing, in the operated condition thereof, transmission of said first carrier wave at a predetermined level into said path and for causing, in the restored condition thereof, suppression of said first carrier wave and means whereby said lastmentioned causing means is caused to operate in response to said change in said first telephone circuit and is caused to restore substantially upon said restoration from said change; receiving means at said second carrier terminal for receiving said first carrier wave; means in said second telephone circuit connected to said receiving means for producing in said second telephone circuit a change from one to another circuit condition in response to said transmission of said first carrier wave and for effecting restoration from said lastmentioned change in response to said suppression of said first carrier wave, said two lastmentioned circuit conditions being discrete for direct current, whereby said lastmentioned change and restoration convey forward signals over said second telephone circuit in said steady state direct current form; and further switching means connected at the incoming end of said second telephone circuit for producing in said second telephone circuit a further change from one to another circuit condition and a restoration from said further change, means whereby said further switching means is caused to operate commencing substantially upon the answering of said call and is caused to restore substantially upon the backward clearing of said call, said two lastmentioned circuit conditions being discrete for direct current, whereby said lastmentioned change and restoration convey backward signals over said second telephone circuit in said steady state direct current form; means at said second carrier terminal for generating a second carrier wave, control means including means connected between said lastmentioned generating means and said carrier transmission path for changing the transmission level of said second carrier wave in said path and means whereby said lastmentioned changing means is caused to operate and thereby change said lastmentiond transmission level in response to said further change in said second telephone circuit and is caused to restore substantially upon said restoration from said further change; receiving means at said first carrier terminal for receiving said second carrier wave, and means in said first telephone circuit connected to said lastmentioned receiving means for producing in said first telephone circuit another change from one to another circuit condition in response to a change in said transmission level of said second carrier wave and for effecting restoration from said other change in response to restoration from said change in said transmission level of said second carrier wave, said two lastmentioned circuit conditions being discrete for direct current, whereby said lastmentioned change and restoration convey backward signals over said first telephone circuit in said steady state direct current form, and means in said first telephone circuit responsive to one of said lastmentioned backward signals for indicating that the call has been answered.

5. In a telephone system including a first carrier terminal, a second carrier terminal and a carrier transmission path between said terminals, a first telephone circuit coming into said first carrier terminal and a second telephone circuit going out from said second carrier terminal; switching means connected at the outgoing end of said first telephone circuit for producing in said first telephone circuit a change from one to another circuit condition and a restoration from said change, means whereby said switching means is caused to operate substantially upon the initiation of a call and is caused to restore substantially upon the forward clearing of said call, said two circuit conditions being discrete for direct current, whereby said change and restoration convey forward signals over said first telephone circuit in the steady state direct current form; means at said first carrier terminal for generating a first carrier wave, a suppressed carrier modulator connected with said generating means, and connected between said first telephone circuit and said transmission path to transmit speech currents as sidebands of said first carrier wave over said path, and control means including means connected between said generating means and said transmission path for changing the transmission level of said first carrier wave in said path and means whereby said changing means is caused to operate in response to said change in said first telephone circuit and is caused to restore substantially upon said restoration from said change; receiving means including an envelope detector at said second carrier terminal for receiving said first carrier wave and for demodulating said sidebands; means in said second telephone circuit connected to said receiving means for producing in said second telephone circuit a change from one to another circuit condition in response to a change in said transmission level and for effecting restoration from said change in said second telephone circuit in response to restoration from said change in said transmission level, said two lastmentioned circuit conditions being discrete for direct current, whereby said lastmentioned change and restoration convey forward signals over said second telephone circuit in said steady state direct current form; and further switching means connected at the incoming end of said second telephone circuit for producing in said second telephone circuit a further change from one to another circuit condition and a restoration from said further change, means whereby said further switching means is caused to operate commencing substantially upon the answering of said call and is caused to restore substantially upon the backward clearing of said call, said two lastmentioned circuit conditions being discrete for direct current, whereby said lastmentioned change and restoration convey backward signals over said second telephone circuit in said steady state direct current form; means at said second carrier terminal for generating a second carrier wave, a suppressed carrier modulator connected with said lastmentioned generating means and connected between said second telephone circuit and said transmission path to transmit speech currents as sidebands of said second carrier wave over said path, control means including means connected between said lastmentioned generating means and said carrier transmission path for causing, in the operated condition thereof, transmission of said second carrier wave at a predetermined level into said path and for causing, in the restored condition thereof, transmission of said second carrier wave at a level lower than said predetermined level and means whereby said lastmentioned causing means is caused to operate in response to said further change in said second telephone circuit and is caused to restore substantially upon said restoration from said further change; receiving means including an envelope detector at said first carrier terminal for receiving said second carrier wave and for demodulating said lastmentioned sidebands during the transmission of said second carrier wave at either of said levels, and means in said first telephone circuit connected to said lastmentioned receiving means for producing in said first telephone circuit another change from one to another circuit condition in response to said predetermined level of said second carrier wave and for effecting restoration from said other change in response to said lower level of said second carrier wave, said two lastmentioned circuit conditions being discrete for direct current, whereby said lastmentioned change and restoration convey backward signals over said first telephone circuit in said steady state direct current form, and means in said first telephone circuit responsive to one of said lastmentioned backward signals for indicating that the call has been answered.

6. In a telephone system including a first carrier terminal, a second carrier terminal and a carrier transmission path between said terminals, a first telephone circuit coming into said first carrier terminal and a second telephone circuit going out from said second carrier terminal; switching means connected at the outgoing end of said first telephone circuit for producing in said first telephone circuit a change from one to another circuit condition and a restoration from said change, means whereby said switching means is caused to operate substantially upon the initiation of a call and is caused to restore substantially upon the forward clearing of said call, said two circuit conditions being discrete for direct current, whereby said change and restoration convey forward signals over said first telephone circuit in the steady state direct current form; means at said first carrier terminal for generating a first carrier wave, a suppressed carrier modulator connected with said generating means, and connected between said first telephone circuit and said transmission path to transmit speech currents as sidebands of said first carrier wave over said path, and control means including means connected between said generating means and said transmission path for changing the transmission level of said first carrier wave in said path and means whereby said changing means is caused to operate in response to said change in said first telephone circuit and is caused to restore substantially upon said restoration from said change; receiving means including an envelope detector at said second carrier terminal for receiving said first carrier wave and for demodulating said sidebands; means in said second telephone circuit connected to said receiving means for producing in said second telephone circuit a change from one to another circuit condition in response to a change in said transmission level and for effecting restoration from said change in said second telephone circuit in response to restoration from said change in said transmission level, said two last-mentioned circuit conditions being discrete for direct current, whereby said last-mentioned change and restoration convey forward signals over said second telephone circuit in said steady state direct current form; and further switching means connected at the incoming end of said second telephone circuit for producing in said second telephone circuit a further change from one to another circuit condition and a restoration from said further change, means whereby said further switching means is caused to operate commencing substantially upon the answering of said call and is caused to restore substantially upon the backward clearing of said call, said two lastmentioned circuit conditions being discrete for direct current, whereby said last-mentioned change and restoration convey backward signals over said second telephone circuit in said steady state direct current form; means at said second carrier terminal for generating a second carrier wave, a suppressed carrier modulator connected with said lastmentioned generating means and connected between said second telephone circuit and said transmission path to transmit speech currents as sidebands of said second carrier wave over said path, first attenuating means interposed in the connection between said lastmentioned modulator and said second telephone circuit, control means including means connected between said lastmentioned generating means and said carrier transmission path for changing said second carrier wave from a lower transmission level to a higher transmission level in said path, means connected to said attenuating means for removing said attenuating means from said connection between said modulator and said second telephone circuit and means whereby said lastmentioned changing and removing means are caused to operate in response to said further change in said second telephone circuit and are caused to restore substantially upon said restoration from said further change; receiving means including an envelope detector at said first carrier terminal for receiving said second carrier wave and for demodulating said lastmentioned sidebands during the transmission of said second carrier wave at either of said levels, second attenuating means connectable between said envelope detector and said first telephone circuit, and means including means connected to said attenuating means, said first telephone circuit and said receiving means for interposing said second attenuating means between said envelope detector and said first telephone circuit, means in said first telephone circuit for prodcing in said first telephone circuit another change from one to another circuit condition and for effecting restoration from said other change, said two lastmentioned circuit conditons being discrete for direct current, and means connected to said lastmentioned receiving means whereby said lastmentioned interposing and producing means are caused to operate in response to said higher transmission level of said second carrier wave and are caused to restore in response to restoration of said second carrier wave to said lower level, whereby said lastmentioned change and restoration convey backward signals over said first telephone circuit in said steady state direct current form, and means in said first telephone circuit responsive to one of said lastmentoned backward signals for indicating that the call has been answered.

7. In a telephone system including a first carrier terminal, a second carrier terminal and a carrier transmission path between said terminals, a first telephone circuit coming into said first carrier terminal and a second telephone circuit going out from said second carrier terminal; switching means connected at the outgoing end of said first telephone circuit for producing in said first telephone circuit a change from one to another circuit condition and a restoration from said change, means whereby said switching means is caused to operate substantially upon the initiation of a call and is caused to restore substantially upon the forward clearing of said call, said two circuit conditions being discrete for direct current, whereby said change and restoration convey forward signals over said first telephone circuit in the steady state direct current form; means at said first carrier terminal for generating a first carrier wave, a suppressed carrier modulator connected with said generating means and connected between said first telephone circuit and said transmission path to transmit speech currents as sidebands of said first carrier wave over said path; and control means including means connected between said generating means and said transmission path for causing, in the operated condition thereof, transmission of said first carrier wave at a predetermined level into said path and for causing, in the restored condition thereof, suppression of said first carrier wave and means whereby said changing means is caused to operate in response to said change in said first telephone circuit and is caused to restore substantially upon said restoration from said change; receiving means including an envelope detector at said second carrier terminal for receiving said first carrier wave and for demodulating said sidebands; means in said second telephone circuit connected to said receiving means for producing in said second telephone circuit a change from one to another circuit condition in response to said transmission of said first carrier wave and for effecting restoration from said lastmentioned change in response to said suppression of transmission of said carrier wave, said two lastmentioned circuit conditions being discrete for direct current, whereby said lastmentioned change and restoration convey forward signals over said second telephone circuit in said steady state direct current form; and further switching means connected at the incoming end of said second telephone circuit for producing in said second telephone circuit a further change from one to another circuit condition and a restoration from said further change, means whereby said further switching means is caused to operate commencing substantially upon the answering of said call and is caused to restore substantially upon the backward clearing of said call, said two lastmentioned circuit conditions being discrete for direct current, whereby said lastmentioned change and restoration convey backward signals over said second telephone circuit in said steady state direct current form; means at said second carrier terminal for generating a second carrier wave, a suppressed carrier modulator connected with said lastmentioned generating means, and connected between said second telephone circuit and said transmission path to transmit speech currents as sidebands of said second carrier wave over said path; control means including means connected between said lastmentioned generating means and said transmission path for causing, in the operated condition thereof, transmission of said second carrier wave at a predetermined level into said path and for causing, in the restored condition thereof, suppression of said second carrier wave and means whereby said lastmentioned causing means is caused to operate in response to said further change in said second telephone circuit and is caused to restore substantially upon said restoration from said further change; receiving means including an envelope detector at said first carrier terminal for demodulating said lastmentioned sidebands and for receiving said second carrier wave, means for generating a third carrier wave of the same frequency as said second carrier wave and connections therefrom to said envelope detector for the demodulation of said lastmentioned sidebands prior to the transmission of said second carrier wave; and means including means connected to said lastmentioned generating means for disconnecting said lastmentioned generating means from said lastmentioned envelope detector, means in said first telephone circuit for producing in said first telephone circuit another change from one to another circuit condition and for effecting restoration from said other change, said two lastmentioned circuit conditions being discrete for direct current, and means connected to said lastmentioned receiving means whereby said lastmentioned changing means and said disconnecting means are caused to operate in response to said predetermined level of said second carrier wave and are caused to restore in response to suppression of said second carrier wave, whereby said lastmentioned change and restoration convey backward signals over said first telephone circuit in said steady state direct current form, and means in said first telephone circuit responsive to one of said lastmentioned backward signals for indicating that the call has been answered.

THOMAS SAMUEL SKILLMAN.

REFERENCES CITED

The following references are of record in the file of this patent:

UNITED STATES PATENTS

| Number | Name | Date |
|---|---|---|
| 1,472,821 | Affel | Nov. 6, 1923 |
| 2,064,958 | Taylor | Dec. 22, 1936 |
| 2,210,957 | Skillman | Aug. 13, 1940 |
| 2,215,482 | Skillman | Sept. 24, 1940 |
| 2,215,483 | Skillman | Sept. 24, 1940 |
| 2,231,958 | Skillman | Feb. 18, 1941 |
| 2,238,555 | Dudley | Apr. 15, 1941 |
| 2,289,048 | Sandalls | July 7, 1942 |
| 2,308,637 | Babcock | Jan. 19, 1943 |
| 2,317,191 | Holbrook | Apr. 20, 1943 |
| 2,381,758 | Kenefake | Aug. 7, 1945 |
| 2,411,786 | Halstead | Nov. 26, 1946 |
| 2,413,075 | Schade | Dec. 24, 1946 |

FOREIGN PATENTS

| Number | Country | Date |
|---|---|---|
| 267,151 | Great Britain | Sept. 7, 1928 |
| 298,952 | Great Britain | Feb. 17, 1930 |
| 319,193 | Great Britain | Sept. 9, 1929 |
| 489,545 | Great Britain | July 25, 1938 |
| 523,066 | Great Britain | July 4, 1940 |